United States Patent [19]

Dodge

[11] 3,745,663
[45] July 17, 1973

[54] MEASURING DEVICE
[75] Inventor: Harry G. Dodge, Painesville, Ohio
[73] Assignee: Crawford Fitting Company, Solon, Ohio
[22] Filed: June 16, 1971
[21] Appl. No.: 153,531

[52] U.S. Cl. .................................. 33/173, 33/137 R
[51] Int. Cl. .............................................. G01b 5/02
[58] Field of Search...................... 33/137, 138, 167, 33/174 D, 174 N, 173

[56] References Cited
UNITED STATES PATENTS
3,095,651  7/1963  Luedicke ............................. 33/138

Primary Examiner—Louis R. Prince
Assistant Examiner—Jon W. Henry
Attorney—Robert J. Fay et al.

[57] ABSTRACT

A measuring device comprising a conventional, metal measuring tape including a hook member adapted to be connected to the outer free end of the tape and having an arcuate shape corresponding with the shape of a cylindrical member which is to be measured. The hook member is located so that its center of curvature is aligned with the zero point of the tape. An arm assembly is carried on the tape housing for pivotal movement about the longitudinal axis of the tape. A surface of the arm is arranged to extend exactly perpendicular to the tape axis to serve as a measuring datum.

4 Claims, 4 Drawing Figures

PATENTED JUL 17 1973 3,745,663

INVENTOR.
HARRY G. DODGE
BY
Fay, Sharpe & Mulholland
ATTORNEYS

MEASURING DEVICE

The subject invention is directed toward the art of measuring devices and, more particularly, to an improved measuring tape arranged to simplify measuring centerline distances on cylindrical members.

The invention is especially suited for measuring pipe and tube when making layouts and will be described with special reference thereto; however, as will become apparent, the invention could be used for many other purposes.

Pipe and tube layouts are generally made on a center-line-to-centerline basis. This creates some practical problems particularly, for example, when trying to lay out a line with a bend in it. In such a case, the distance from the centerline of one leg to the free end of the other leg may be specified as a given number of inches or feet. Using existing measuring devices, it is difficult to make an accurate measurement of this sort since it is necessary to estimate the centerline location.

The subject invention provides a measuring device which overcomes the noted problems and simplifies tube layouts. In accordance with one aspect, the invention contemplates an improved assembly for attachment to conventional metal measuring tapes of the type which can be retracted into a housing. One portion of the assembly includes a hook member which is adapted to be connected to the outer free end of the tape. The hook member is arcuate and arranged so that its center of curvature can be aligned with the zero point of the tape and coincides with the axis of a tube adapted to be disposed within the hook when measuring. Adapted to be mounted on the tape housing is an arm arranged to extend generally perpendicular to the longitudinal axis of the tape. Preferably, the arm is supported for pivotal movement about the axis of the tape so that it can be used as a datum point.

In accordance with a more limited aspect, the hook member is preferably adapted to be removably connected to the tape by at least one pin or stud which extends from the hook through an opening in the end of the tape. A sleeve is arranged to be mounted on the tape so that it can be slid over a portion of the hook to encircle the tape and hold the hook to the tape.

As can be appreciated, when measuring tube bends or the like, the hook member is merely connected over one leg of the bend. The zero point of the tape is thus aligned with the centerline of the tube. The arm can be rotated to rest on the other leg of the tube. The face of the arm can be used as the datum point for transferring measurements. By use of the invention, it is not necessary to estimate the location of the tube centerline.

A more limited aspect of the invention contemplates that a series of different sized hook members can be provided so that the device can be used for making measurements on pipes and tubes of different diameters. For example, the hooks can be made so that their curvatures correspond to all standard tubing's O.D. Because of the quick release type connection between the tape and the hook members, it is a simple matter to convert for different tube sizes.

The invention also contemplates that the tape can be of the type having a curved cross-section so that the hook retaining sleeve is maintained in position by the natural resiliency of the tape. Alternately, the sleeve itself can be resilient. For example, it can comprise a band of rubber or the like.

As is apparent from the above, a primary object of the invention is the provision of a device particularly suited for making centerline measurements on tubes, pipes or other cylindrical members.

Yet another object is the provision of a device which facilitates the layout of tubing systems by eliminating the need for estimating tube centerline measurements.

A further object is the provision of an assembly of the type described which can be used on many different measuring tapes.

A still further object of the invention is the provision of a device of the type referred to wherein the hook can be readily removed from the tape.

The above and other objects and advantages will become apparent from the following description when read in conjunction with the accompanying drawings wherein.

Figure 1:
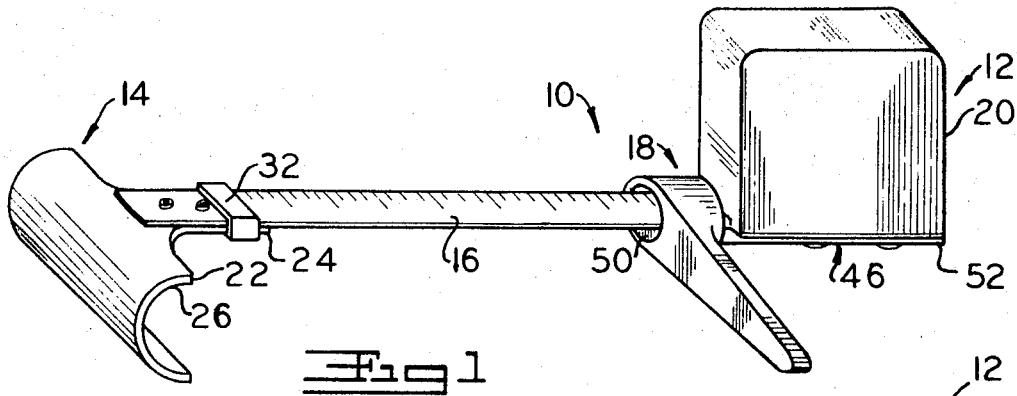
FIG. 1 is a pictorial view showing a preferred embodiment of the improved measuring tape assembly.

Referring more particularly to FIG. 1, the preferred embodiment of the apparatus 10 is shown as comprising a relatively conventional metal measuring tape 12 having a hook assembly 14 connected to the outer free end of the tape 16. Carried from the housing 20 of the tape assembly 12 is an arm assembly 18. The tape assembly 12 is shown as a conventional commercially available measuring tape which includes the previously mentioned metal tape 16 suitably provided with measuring indicia and arranged to be coiled within the housing 20. Normally, a spring return mechanism is included within the housing so as to cause the tape to readily retract into the housing upon completion of a measuring operation. Additionally, the tapes usually have a slightly curved cross-section in planes perpendicular to their longitudinal axis.

Measuring tapes of the type shown are typically used for making measurements when laying out piping or tubing systems. As previously mentioned, one of the difficulties is that the pipe layouts are normally made on centerline-to-centerline distances. For example, the length of a leg of a bend is normally given from the centerline of one leg to the end of the other leg. The only way it was possible to make this measurement in the past was by roughly estimating the centerline of the tube and holding the end of the tape at the estimated position while the other end was held in position adjacent the point being measured. The difficulties involved in making accurate measurements by this prior system are apparent.

The subject invention overcomes these problems by providing the hook assembly 14 which allows the end or zero point of the tape to be held in alignment with the centerline of the pipe or tube from which the measurement is to be made. Although the details of the hook assembly can vary, in the embodiment under consideration, it includes a metal hook member 22 having a tang portion 24. The hook 22 includes a downwardly extending section having a curved or arcuate inner face 26 which preferably has a radius of curvature corresponding to the radius of curvature of the outer surface of the tube or other cylindrical member which is to be measured. The circumferential extent of the surface 26 should be less than 180° but desirably slightly greater than 90° so that it can be positively hooked on the tube or pipe. The length of the hook member 22 can vary substantially; however, it should preferably be long enough to provide some measure of lateral rigidity.

Figure 2:
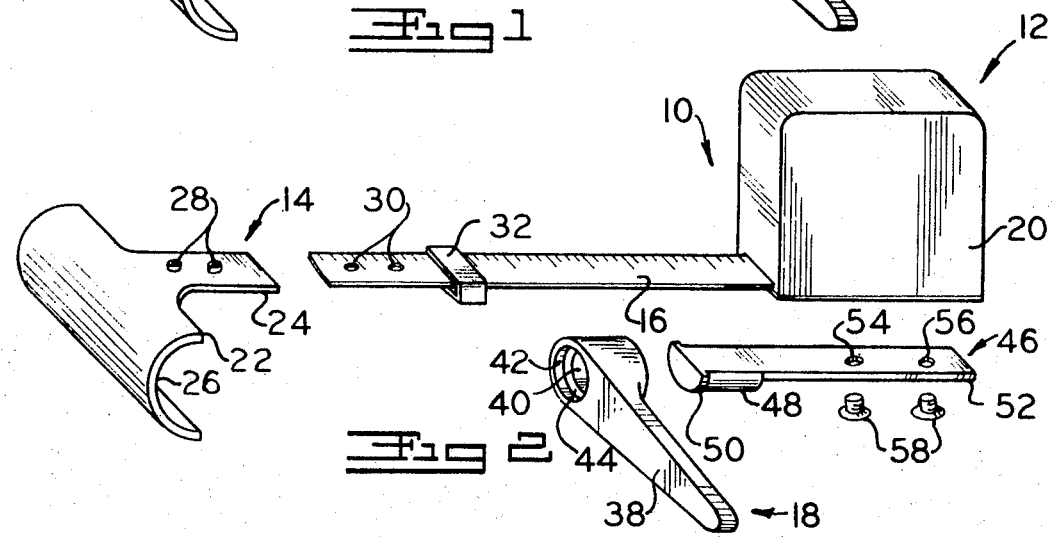
FIG. 2 is an exploded pictorial view showing the various components of the measuring tape assembly in a disassembled position.
Figure 3:
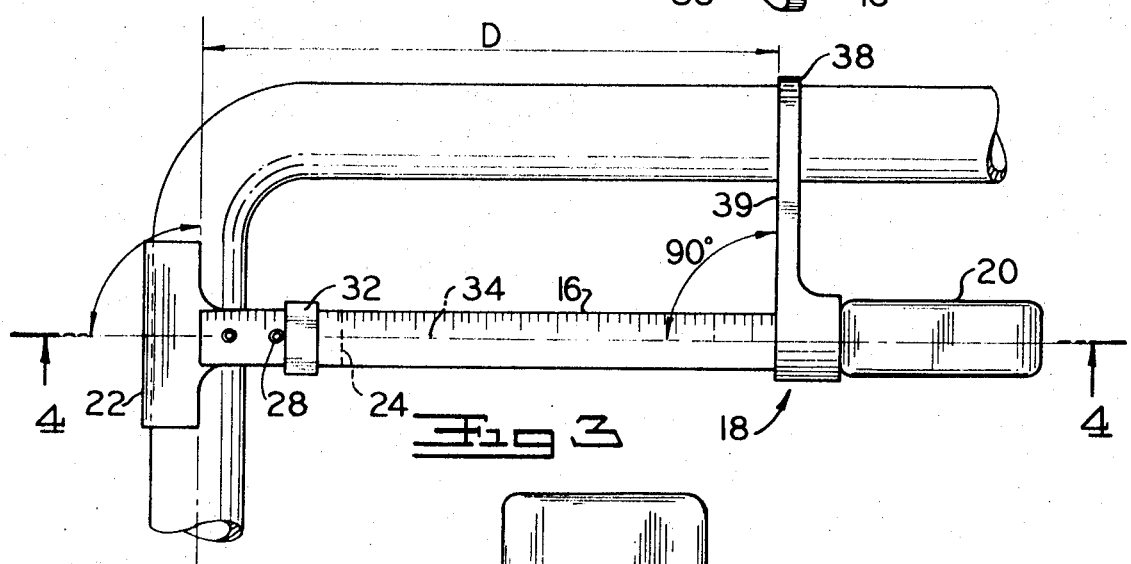
FIG. 3 is a plan view showing how the tape assembly can be used for measuring a centerline distance on a tube bend; and, FIG. 4 is a cross-sectional view taken on line 4—4 of FIG. 3.
Figure 4:
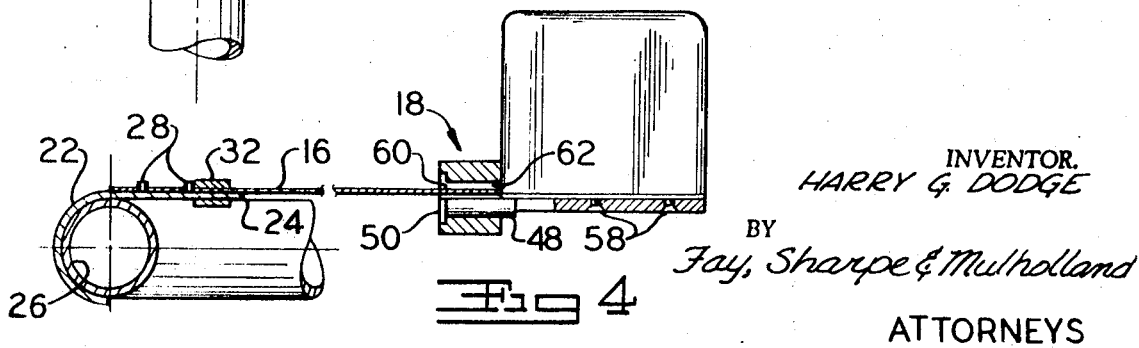

For reasons which will hereafter be discussed, the hook member 22 is releasably connected to the free end of the tape 16 in a manner such that the zero point of the tape is in alignment with the center of curvature of surface 26. This is shown in FIG. 4. In accordance with one preferred feature of the invention, the hook member 22 is releasably connected to the tape in a manner which permits it to be quickly removed if the tape is to be used for other types of measuring operations in which the hook is not required or when a hook of a different size is required. The releasable connecting means could take many forms however, in the subject embodiment, they comprise at least one or more pins or studs 28 which extend upwardly from the tang 24. The studs 28 are positioned so as to engage openings 30 carried or formed in the free end of tape 16. The openings 30 are present in most measuring tapes provided with an L-shaped hook end. Thus, merely removing the standard L-shaped hook allows the hook assembly of the invention to be installed. Note that the pins 28 extend upwardly through the openings 30 and are retained therein by a slide sleeve 32 which can be slid longitudinally on the tape to encircle the tang 24 and the top surface of tape 16. The sleeve can be formed from a non-resilient material and the inherent resiliency of the conventional, curved cross-section tape relied upon to maintain it in position. Alternately, sleeve 32 can be formed from a resilient maerial and comprise nothing more than a heavy rubber band, for example. As best shown in FIGS. 3 and 4, the hook member 22 is preferably connected so that the surface 26 is at a right angle to the longitudinal centerline 34 of tape 16. Additionally, it is preferable to have the hook extend downwardly from the end of the tape in the manner shown in FIGS. 1, 2 and 4.

The arm assembly 18 is shown connected to the housing 20 and arranged so that the arm is free to pivot about the longitudinal aixs 34 of tape 16. This could be accomplished in many ways; however, in the embodiment under consideration, arm assembly 18 includes a laterally extending arm member 38 which is preferably tapered as shown. A center bore 40 extends through the arm perpendicular to its face and has a counterbore 42 formed inwardly to provide a shoulder 44. The arm is maintained in position on the housing 20 by a mounting member 46 which has an enlarged cylindrical end portion 48. The diameter of portion 48 corresponds to the diameter of opening 40. A shoulder or flange 50 preferably extends outwardly from the outer end of cylindrical portion 48. As is apparent, the arm 38 can be slid onto portion 48 and is prevented from coming off by the cooperation of the flange 50 and the counterbore 42.

Extending to the right from the section 48 (as viewed in FIG. 2) is a somewhat reduced diamter section 52 provided with a pair of openings 54, 56. Openings 54, 56 allow the support member 46 to be connected to the undersurface of the housing 20 by, for example, screws 58. As best seen in FIG. 4, the top surface of the section 48 is flattened as shown at 60 so that when the arm is in position, an opening 62 is provided through the arm. The tape 16 can thus pass freely through the arm 38 so that the normal functioning of the tape is not affected.

In FIG. 3, the device is shown being used to measure a distance along one leg of a bend. Note that the hook member 22 is engaged over one leg of the bend. The zero point of the tape is thus aligned with the centerline of the tube. The distance D from the centerline along the other leg of the bend is indicated by the position of the arm 38. Preferably, the face 39 of arm 38 extends exactly perpendicular to the axis 34 of the tape 16. Thus, the distance from the centerline to the face 39 is given on the scale of tape 16. The rotatable nature of the arm 38 permits it to be spun to any convenient relationship with the tape so that measurements can be made to any side of the tape.

The invention has been described in great detail sufficient to enable one of ordinary skill in the measuring art to make and use the same. Obviously, modifications and alternations of the preferred embodiment will occur to others upon a reading and understnding of the specification and it is my intention to include all such modifications and alterations as part of my invention insofar as they come within the scope of the appended claims.

What is claimed is:

1. In combination:
    an elongated measuring tape including a housing into which the tape can be retracted;
    a hook member connected to the outer free end of the tape and having an arcuate portion arranged so that its center of curvature is aligned with the zero point of the tape and coincides with the axis of a tube adapted to be disposed within said arcuate portion when measuring; and,
    an arm assembly mounted on the tape housing to extend generally perpendicular to the longitudinal axis of the tape, support means connected to said housing and carrying said arm for permitting pivotal movement of said arm about the axis of the tape so that a surface on said arm can be used as a datum point.

2. The combination of claim 1 wherein the hook member is removably connected to the tape by at least one pin which extends laterally from the hook member.

3. The combination of claim 2 including a sleeve member to hold tape and hook member together encircling the tape and the hook.

4. The combination of claim 4 wherein said support means includes a shaft extending parallel to said tape.

* * * * *